United States Patent [19]

Miller et al.

[11] Patent Number: 5,170,854
[45] Date of Patent: Dec. 15, 1992

[54] SEAL FOR A PLATFORM SCALE

[76] Inventors: Mahlon W. Miller, 3810 SE. 92nd Ave., Portland, Oreg. 97266; Patrick F. Tierney, 810 NW. Bellevista, Gresham, Oreg. 97030

[21] Appl. No.: 718,567

[22] Filed: Jun. 20, 1991

[51] Int. Cl.⁵ ............................................. G01G 19/02
[52] U.S. Cl. ................................................. 177/135
[58] Field of Search .......................................... 177/135

[56] References Cited

U.S. PATENT DOCUMENTS

| | | | |
|---|---|---|---|
| 4,290,249 | 9/1981 | Mass | 52/396 |
| 4,729,443 | 3/1988 | Iadarola | 177/135 |
| 4,916,878 | 4/1990 | Nicholas | 52/396 |

Primary Examiner—George H. Miller, Jr.
Attorney, Agent, or Firm—James D. Givnan, Jr.

[57] ABSTRACT

A T-shaped seal is disclosed for installation in the gap between a scale pit wall and a scale platform to prevent entry of foreign matter into the area below the platform. An upright stem of the seal is provided on its sides with vertically spaced ribs which may flex during installation between the scale pit wall and the platform edge. The ribs prevent upward dislodgement of the seal against all but intentional efforts and provide additional barriers to foreign material. The stem is of a flexible nature to accomodate irregular pit wall and scale surfaces. A ventilator is shown for installation within an opening formed in the flange portion of the seal and serves to permit the circulation of air beneath the platform while preventing the entry of material into the gap between the scale platform and pit wall.

6 Claims, 1 Drawing Sheet

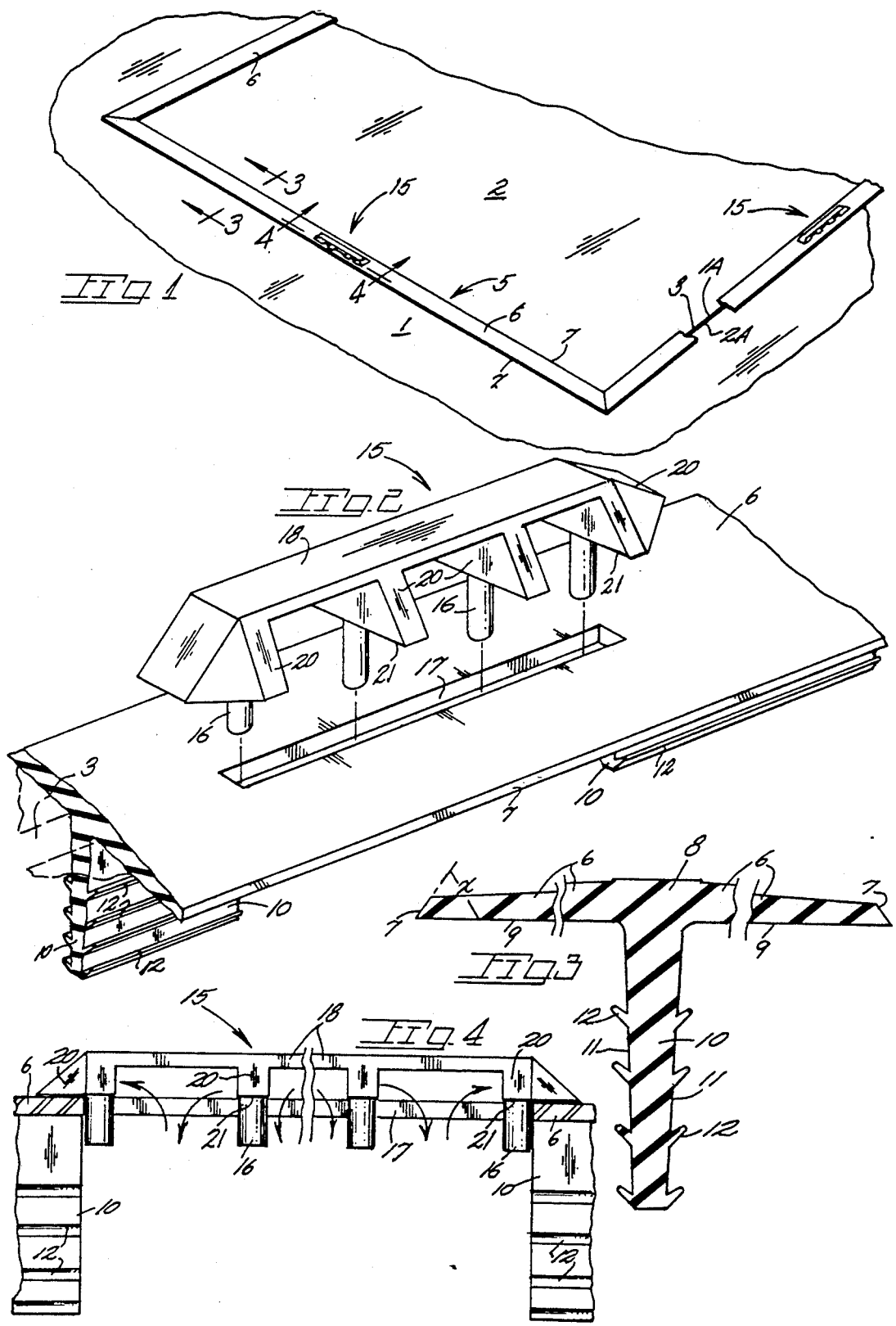

SEAL FOR A PLATFORM SCALE

BACKGROUND OF THE INVENTION

The present invention pertains generally to a seal or barrier for installation between a scale platform and the surface of a scale pit wall spaced about the platform.

In large scales, for the weighing of vehicles and the like, a problem exists by reason of a gap between the platform perimeter and the pit wall. Commonly such a gap will be up to an inch which permits the entry of foreign matter into the pit area beneath the platform. The collection of foreign matter as well as moisture and occasionally gaseous fumes can cause problems resulting in unrealiable scale operation and/or an undesirable collection of explosive gasses in the scale pit. This problem is not entirely remedied by the use of a T-shaped seal with the stem thereof inserted vertically between the platform and the scale pit wall. As such seals are of a resilient nature foreign matter can work its way beneath the seal and into the gap between the platform and the pit wall. Ventilating of the pit by leaving gaps in the seal while permitting an air flow into the pit is undesirable in that it also permits the entry of foreign matter and moisture by reason of seal continuity being interrupted.

U.S. Pat. No. 4,729.443 discloses a seal of T-shape section for use in conjunction with a platform scale. No provision is made for retention of the seal in the gap between a scale deck and a scale pit wall nor is provision made for ventilating the underside of the scale deck. U.S. Pat. No. 4,290,249 shows an expansion strip for a highway with projections for strip retention between highway sections.

Another problem with known scale seals for installation between the scale platform and the scale pit wall is the problem of seal dislodgement by wheel supported loads wheeled into place and off of the scale platform. As the pit wall is stationary while the scale platform or deck is not it is not uncommon for seals to work their way upwardly from between the wall and the scale to a point where they become totally separated from scale structure whereat they become subject to damage by contact with a vehicle wheel. The servicing of a platform scale incurs substantial cost which can be reduced by both sealing as well as ventilating that area of the scale below the platform.

SUMMARY OF THE PRESENT INVENTION

The present invention is embodied within a platform seal which includes a stem of a configuration which resists upward dislodgement from between a scale platform and a scale pit wall while simultaneously providing a horizontal flange for surfacial engagement with platform and pit surfaces. Further, the seal may be provided with a ventilator.

The present seal includes an upright stem having ribs extending therealong which flexibly engage scale structure to resist upward displacement of the stem. Such ribs are upwardly inclined and flex upon contact with scale structure to accommodate a wide range of spacings or gaps between the scale platform and the pit wall. The stem is tapered downwardly and is also of a flexible nature to permit bending of the stem to accommodate irregular wall surfaces encountered on some scales. The flange of the T-shape seal is of a semi-rigid elastomeric material such as neoprene rubber and of a thickness to assure surfacial engagement with both the platform as well as the pit perimeters to prevent foreign matter from working its way below the flange and toward the gap between platform and scale pit. Toward this end, the flange terminates at its parallel sides in an abrupt edge to assure desired flange rigidity.

Provision is made for ventilating that area beneath the scale platform by use of a ventilator engageable with the seal in an opening in the seal flange legs of the ventilator seat within the flange opening and facilitates anchoring of the ventilator in place. The ventilator serves to prevent the entry of rainwater into the pit area as the ventilator obscures the opening in the seal flange while permitting the free flow of air through said opening. Legs anchor the ventilator in place and if so desired, may be secured to the seal by use of a suitable bonding agent. The ventilator is able to withstand loads imparted by vehicles wheels moving onto and off of the scale platform.

Important objectives of the present invention include the provision of a scale seal highly resistant to dislodgement by vehicles or other loads moving onto and off of a scale platform; the provision of the seal including a stem having ribs configured to resist upward displacement of a stem when in place between a scale platform and a scale pit wall; the provision of a seal of T-shape having a flange terminating in an abrupt downwardly inclined edge surface to provide a barrier to liquids; the provision of a ventilator within a platform seal to permit ventilation of that area below the scale platform while preventing the entry of rain, spillage or ground water (depending on depth) through a seal opening in which the ventilator is mounted.

BRIEF DESCRIPTION OF THE DRAWINGS

In the accompanying drawings;

FIG. 1 is a fragmentary perspective view of a platform scale and surrounding scale pit structure;

FIG. 2 is a perspective of a segment of the present seal with a ventilator raised away from the seal to disclose ventilator structure;

FIG. 3 is a vertical sectional view taken along 3—3 of FIG. 1; and

FIG. 4 is a vertical sectional view taken along line 4—4 of FIG. 2.

DETAILED DESCRIPTION OF THE PREFERRED EMBODIMENTS

In the accompanying drawings, applied reference numerals indicate parts similarly hereinafter identified wherein the reference numeral 1 indicates a horizontal scale pit surface in place about a platform or deck 2 of a scale. A vertical wall surface 1A indicates the scale pit wall which is vertical and extends about a platform edge 2A in a spaced manner to provide a gap 3 about the platform. Platform edge 2A faces wall surface 1A and is normally spaced therefrom about ½ inch to one inch. The horizontal surfaces of surface 1 and platform 2 are normally coplanar.

Indicated at 5 is the present seal for installation in the gap between platform 2 and pit wall surface 1A. The seal includes a flange 6 having side edges 7. A mid portion 8 of the flange is of greater thickness than the flange extremeties and serves to resist curling of the seal. The side edges 7 preferably define an included angle of approximately 55 degrees at X (FIG. 3) along with the bottom surfaces 9 of each flange. The undersides 9 of the flange lie in surfacial engagement with surface 1 and platform surface 2 to prevent the entry of foreign matter into the gap 3 between the platform and the pit wall. Additionally the inclined side edges 7 provide a barrier against spillage or water collecting on and about the scale.

The stem at 10 of the seal is integral with flange 6 and is somewhat tapered with sidewalls indicated at 11. Projecting outwardly and upwardly relative said stem sidewalls are ribs 12 of flexible construction for purposes of frictional engagement with wall surfaces 1A-2A of the pit wall and platform which may have surface irregularities.

With attention to FIG. 2 a ventilator generally at 15 includes a series of extensions 16 which are insertably engageable with an opening 17 formed in flange 6. To accommodate the ventilator extensions a segment of stem 10 is removed from the seal coincident with opening 17 and provides an airway to the underside of the seal and ultimately to the area below scale platform 2. A cover 18 of the ventilator is of a length and width to divert the direct entry of material (liquid or solid) into slot shaped opening 17. Pedestals 20 terminate downwardly in surfaces 21 for supported engagement with the uppermost surface of flange 6. Accordingly air may flow between the pedestals or supports 20 and through flange opening 17 to ventilate the area beneath platform 2. Installation of the ventilator within a seal may be in a friction type fit to permit periodic ventilator removal for cleaning purposes. The foregoing described ventilator permits air flow into and out of the scale pit beneath the scale platform without resorting to the practice of forming gaps between the ends of multiple seals which expose the scale to entry of foreign matter. The ventilator may be formed from metal or a rigid plastic such a polyurethane and may be a foot or so in length for use in typical industrial platform scales. Should the seals become damaged or worn the ventilator units may be removed for reinstallation in a new seal.

A preferred embodiment of the seal may be six inches or so in width with a stem length of three inches. Rubber serves as a suitable material for seal construction.

While we have shown but a few embodiments of the invention, it will be apparent to those skilled in the art that the invention may be embodied still otherwise without departing from the spirit and scope of the invention.

Having thus described the invention, what is claimed and desired to be secured by a Letters Patent is:

1. A T-shaped seal for a platform scale having a deck with a perimetrical wall spaced inwardly from a scale pit wall contiguous with a scale pit ground surface, said seal comprising, a flange having bottom surfaces for superimposed placement on said deck and said pit ground surface to provide a barrier to foreign matter, an upright stem integral with said flange and having sidewalls for insertion between the deck perimetrical wall of the scale and the scale pit wall, said stem being of tapered section to contribute to stem flexibility, and flexible ribs on said stem sidewalls for deformed engagement with said perimetrical wall and said scale pit wall to resist upward displacement of the seal when in place on a scale.

2. The seal claimed in claim 1 wherein at least some of said ribs are inclined and project toward said flange to define an acute included angle with one of said sidewalls of the stem.

3. The seal claimed in claim 1 wherein said flange terminates laterally in side edges each defining an included angle of approximately 55 degrees with one of said bottom surfaces of the flange.

4. The seal claimed in claim 1 additionally including a ventilator said flange defining an opening for reception of the ventilator.

5. The seal claimed in claim 4 wherein said flange defines an opening, said ventilator including extensions for insertion into said opening.

6. The seal claimed in claim 5 wherein said ventilator extensions are in frictional engagement with flange surfaces defining said opening to permit periodic removal and cleaning of the ventilator.

* * * * *